(12) United States Patent
Fukui

(10) Patent No.: US 8,436,915 B2
(45) Date of Patent: May 7, 2013

(54) IMAGE PROCESSING APPARATUS

(75) Inventor: Toshiyuki Fukui, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 986 days.

(21) Appl. No.: 12/269,415

(22) Filed: Nov. 12, 2008

(65) Prior Publication Data
US 2009/0122153 A1    May 14, 2009

(30) Foreign Application Priority Data

Nov. 13, 2007    (JP) ................................ 2007-294880

(51) Int. Cl.
*H04N 5/76* (2006.01)
(52) U.S. Cl.
USPC .................................................. 348/231.99
(58) Field of Classification Search ............... 348/231.1, 348/231.2, 231.3, 231.4, 231.6, 231.7, 231.8, 348/231.9, 231.99, 714, 715, 716, 718, 719
See application file for complete search history.

(56) References Cited

U.S. PATENT DOCUMENTS

| | | | |
|---|---|---|---|
| 7,113,208 B1 * | 9/2006 | Saga ......................... | 348/231.99 |
| 8,120,672 B2 * | 2/2012 | Okada et al. ............... | 348/231.2 |
| 2002/0015447 A1 * | 2/2002 | Zhou ........................ | 375/240.25 |
| 2006/0114330 A1 * | 6/2006 | Kuroiwa ................... | 348/207.99 |

FOREIGN PATENT DOCUMENTS

| | | |
|---|---|---|
| CA | 1 218 751 | 3/1987 |
| JP | 60-138634 | 7/1985 |
| JP | 63-136171 A | 6/1988 |
| JP | 2007-159049 A | 6/2007 |

OTHER PUBLICATIONS

Office Action issued on Oct. 12, 2012, in counterpart Japanese application No. 2008-283733.

* cited by examiner

*Primary Examiner* — Aung S Moe
*Assistant Examiner* — Chriss Yoder, III
(74) *Attorney, Agent, or Firm* — Fitzpatrick, Cella, Harper & Scinto

(57) ABSTRACT

An image processing apparatus comprises image processing units adapted to process image data obtained from an image input unit, a first memory that stores image data that has been processed by the image processing units, a first bus that transfers the image data between the image processing units and the first memory, a second memory that stores image data transferred from the first memory, a second bus connected to the first memory and the second memory; and a control unit adapted to control the transfer of the image data stored in the first memory to the second memory via the second bus based on a signal from the image processing units indicating that image processing is not currently performed.

22 Claims, 11 Drawing Sheets

IMAGE PROCESSING APPARATUS

BACKGROUND OF THE INVENTION

1. Field of the Invention

The present invention relates to an image processing apparatus, and in particular to a technique for sequentially inputting and processing image data during a predetermined time interval.

2. Description of the Related Art

As a signal processing apparatus capable of executing real-time video signal processing in parallel with processing for inputting an image into a processor, a configuration that provides an image signal bus synchronized with the image signal and a controller within the signal processing apparatus is known (for example, see Japanese Patent Laid-Open No. S60-138634).

However, although the configuration disclosed in Japanese Patent Laid-Open No. S60-138634 enables the parallel execution of image data transfer and CPU data processing, it is necessary to write the original data for the image processing performed by the CPU into a memory through the image signal bus at a predetermined timing. For this reason, with this system, it has been difficult to simultaneously perform processes whose timings of occurrence are not constant due to external factors, such as network processes, while also ensuring that the image processing is performed in real time.

SUMMARY OF THE INVENTION

Having been conceived in light of the aforementioned problem, it is an object of the present invention to provide a technique that makes it possible to simultaneously perform processes whose timings of occurrence are not constant, such as network processes, while also ensuring that image processing is performed in real time.

It is a further object of the present invention to provide a technique to make it possible to quickly detect the occurrence of problems in processing modules and recover from abnormal statuses by using the cyclical nature of image processing.

According to one aspect of the present invention, an image processing apparatus comprises:

image processing units adapted to process image data obtained from an image input unit;

a first memory that stores image data that has been processed by the image processing units;

a first bus that transfers the image data between the image processing units and the first memory;

a second memory that stores image data transferred from the first memory;

a second bus connected to the first memory and the second memory; and a control unit adapted to control the transfer of the image data stored in the first memory to the second memory via the second bus based on a signal from the image processing units indicating that image processing is not currently performed.

Further features of the present invention will become apparent from the following description of exemplary embodiments (with reference to the attached drawings).

DESCRIPTION OF THE EMBODIMENTS

Hereinafter, embodiments of the present invention shall be described in detail with reference to the appended drawings. Note that the constituent elements denoted in the following embodiments are only examples, and the scope of the present invention is not intended to be limited thereto. Furthermore, all combinations of the features described in the following embodiments are not necessarily required to achieve the present invention.

<First Embodiment>

(Configuration of Image Processing Apparatus)

Figure 1:
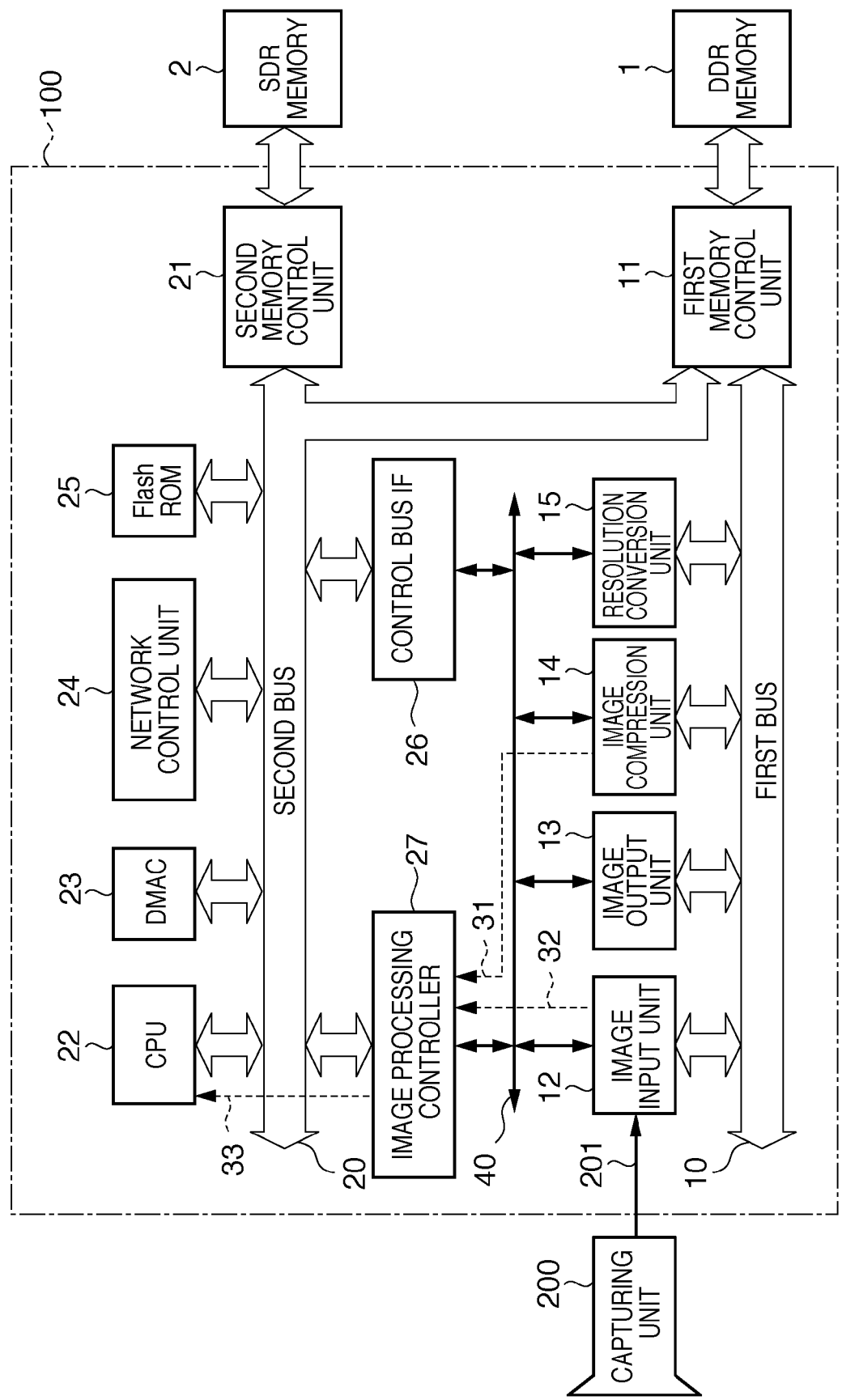
FIG. 1 is a diagram illustrating the configuration of an image processing apparatus.
Figure 2:
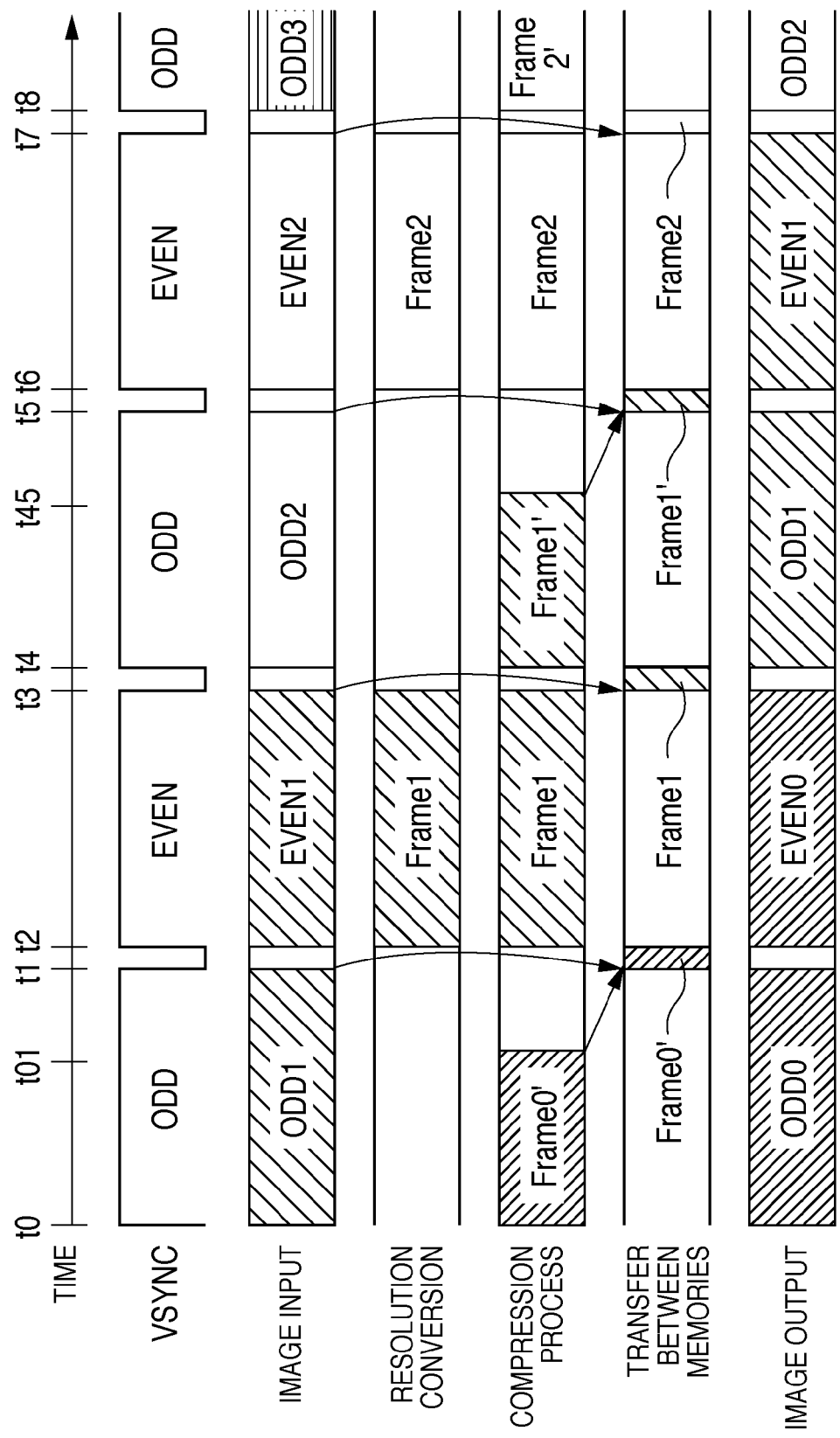
FIG. 2 is a timing chart illustrating an operation example of an image processing apparatus.

FIG. 1 is a diagram illustrating the configuration of an image processing apparatus according to the present embodiment. In FIGS. 1, 1 and 2 are memories, and 100 is an image processing unit that includes memory control units (11, 21) as IF (interface) units connected to the stated two memories. Furthermore, 200 is a capturing unit, and image signals captured by this unit are inputted into an image input unit 12 in the image processing unit 100 via a video input signal line 201. Note that the image processing apparatus can be implemented using a semiconductor integrated circuit, a digital camera, a computer, a camera-equipped cellular phone, or the like.

In the image processing unit 100, reference numeral 10 is a first bus, reference numeral 11 is a first memory control unit connected to the memory 1 (the first memory), and reference numeral 12 is the image input unit; image data is sequentially input thereto during a predetermined time interval. Furthermore, reference numeral 13 is an image output unit, reference numeral 14 is the image compression unit, and reference numeral 15 is a resolution conversion unit. The first bus 10 is connected to the various image processing modules (reference numerals 12, 13, 14, 15) and the first memory control unit 11. The various image processing modules (reference numerals 12, 13, 14, 15) are circuits that perform image processes on the input image data or image data processed by another image processing module. The image processing modules may be implemented as a single circuit or as individual circuits.

Meanwhile, reference numeral 20 is a second bus, and reference numeral 21 is a second memory control unit connected to the memory 2 (the second memory). Reference numeral 22 is a CPU that performs overall control of the image processing unit 100, and reference numeral 23 is a DMA controller (DMAC, or Direct Memory Access Controller). The CPU 22 and DMA controller perform control for transferring image data stored in the memory 1 to the memory 2 via the second bus 20.

Reference numeral 24 is a network control unit serving as a network interface; the network control unit outputs image data that has undergone image processing performed by the image processing modules (reference numerals 12, 13, 14, 15) to an external apparatus. The network control unit 24 is an example of an asynchronous processing unit, and another functional element that performs a predetermined process on image data asynchronously to the input of that image data may be provided instead of, or an addition to, the network control unit 24.

Reference numeral 25 is a flash ROM, reference numeral 26 is a control bus IF, and reference numeral 27 is an image processing controller. The second bus 20 is connected to the various processing modules (reference numerals 22, 23, 24, 25, 26, 27) and the first memory control unit 11 and the second memory control unit 21.

The control bus IF 26 and the image processing controller 27 are connected to a dedicated control bus 40 (control bus). The image processing controller 27 accesses the various image processing modules (reference numerals 12, 13, 14, 15) via the dedicated control bus 40, sets parameters for and reads out values from those various image processing modules, activates and stops the modules, and so on. The CPU 22 is also capable of accessing the various image processing modules (reference numerals 12, 13, 14, 15) via the dedicated control bus 40 by going through the control bus IF 26.

A control signal 32 that communicates the processing status of the image input unit 12 is output from the image input unit 12 to the image processing controller 27. Similarly, a control signal 31 that communicates the processing status of the image compression unit 14 is output from the image compression unit 14 to the image processing controller 27. Furthermore, a control signal 33 is output from the image processing controller 27 to the CPU 22.

In the present embodiment, the first bus 10 is an image bus that connects the image processing modules (reference numerals 12, 13, 14, 15) that are required to perform processing that occurs within a constant processing time. For this reason, in the present embodiment, a DDR (Double Data Rate SDRAM) memory, having high speeds and a wide memory access bandwidth, is given as an example of the memory 1 connected to the first memory control unit 11, which is in turn connected to the first bus 10. In addition, in order to improve the data transfer rate, the first bus 10 is provided with functionality for using only burst transmission during data transmission, separate control of address and data issue sequences, read and write bus separation, and so on. Furthermore, divided usage of the banks in the memory 1 in accordance with the properties of the image processing data is also provided for processing latency masking in the memory.

Meanwhile, modules and the like, including the network control unit 24, in which the timing of occurrence of processes is not constant, are connected to the second bus 20. Although the timing of the occurrence of such processes is not constant with these modules, the modules are less constrained to real-time processing than those of the first bus are. For this reason, in the present embodiment, an SDR (Single Data Rate SDRAM) is given as an example of the memory 2 used primarily by those modules. A memory 2 that uses an SDR has reduced power consumption and a lower cost than the memory 1, which uses a DDR memory. Data transfer in the second bus 20 is not limited only to burst transfer, as in the case of the first bus 10, and the second bus 20 is capable of randomly accessing the memory 2.

(Outline of Operations)

In the present embodiment, as one example, a video image is inputted at a constant rate of 30 frames/second from the capturing unit 200 that captures the image, via the image input unit 12, and is stored in the memory 1. That data is then read back out from the memory 1 as image data to be processed, and image processing is then performed thereon. In the present embodiment, an example of the image processing is compression performed by the image compression unit 14. This image processing is executed in the memory 1, or in other words, in the first memory. Although the present embodiment assumes an interlaced image that alternates display of odd fields and even fields as the video image, it should be noted that the data format is not limited thereto.

The compressed image data is once again stored in the memory 1. The compressed image data is then transferred from the memory 1 to the memory 2 via the second bus 20 based on an instruction from the image processing controller 27. After the CPU 22 performs a process for adding a header to the compressed data, the data is transferred from the network control unit 24 to an external network.

Here, in the present embodiment, the image data that has undergone the image processing is transferred from the memory 1 to the memory 2 during the period in which the various image processing modules (reference numerals 12, 13, 14, 15) are not performing image processing. The network control unit 24 then reads out the image data that has undergone the image processing from the memory 2, rather than the memory 1, and performs a process for transferring the data to an external network and so on. For this reason, according to the configuration of the present embodiment, other processes (in the example of the present embodiment, the transfer to an external network) can be easily executed independent of the image processes that are required to be performed in synchronization with the input of the image data.

The flow of this process shall be described in detail with reference to FIG. 2. FIG. 2 is a timing chart illustrating an operation example of an image processing apparatus according to the present embodiment.

In FIG. 2, VSYNC indicates the vertical synchronization signal extracted from the signal input to the image input unit 12 and on the video input signal line 201. Generally, valid data is included in the video signal in segments where the VSYNC signal is "H" (high). In the example in FIG. 2, at time t0, the image input unit 12 is commencing the transfer of the image data in the ODD field of Frame1 (ODD1) to the memory 1.

This data transfer is executed by the image input unit 12 intermittently outputting a transfer request to the first bus and the data being written into the memory 1 each time a set amount of image data has accumulated in the image input unit 12. In the example shown in FIG. 2, the stated transfer occurs from t0 to t1, and is suspended at time t1 because the entirety of the ODD1 data has been input. After this, the transfer of the image data in the EVEN field of Frame1 (EVEN1) to the memory 1 is commenced starting at time t2. This transfer is suspended at time t3 because the entirety of the EVEN1 data has been input; then, the image transfer of the ODD field of Frame2 (ODD2) is commenced at time t4.

Such processing is repeated by the image input unit 12, and assuming that the video signal is input at a constant rate of 30 frames/second, the amount of time from t0 to t4 is approximately 33.3 milliseconds. Because video signals are input continuously, it is absolutely necessary to end the transfer process within 33.3 milliseconds.

Meanwhile, the image compression unit 14 and resolution conversion unit 15 sequentially read out the image data of Frame1 generated by combining ODD1 and EVEN1, using a read bus of the first bus 10. The image compression unit 14 then executes an image compression process, and the resolution conversion unit 15 executes a resolution conversion process. These processes are commenced after a small amount of time Δt (because Δt is extremely short relative to the interval between time t1 and t2, it not shown in FIG. 2) following time t2, or the start of the transfer of the EVEN1 data from the image input unit 12 to the memory 1, when the data within the memory 1 has entered a state in which it can be read out. The data resulting from these processes is written into the memory 1 using a write bus of the first bus 10. These data processes are also executed by intermittently reading out the data each time enough data to be processable is accumulated in the memory, in the same manner as the image input data transfer, and are executed after a delay equivalent to Δt for the interval from t2 to t3.

Furthermore, from time t4, the image compression unit 14 commences compression processing on image data Frame 1', which has undergone the resolution conversion processing performed previously by the resolution conversion unit 15 from times t2 to t3. The compressed image data Frame1' is written into the memory 1 using the first bus 10, in the same manner as Frame1.

The data written into the memory 1 is transferred from the memory 1 to the memory 2 by the DMA controller 23 that is present in the second bus 20. The transfers between memories, commenced upon the completion of the respective processes performed by the image compression unit 14 and the image input unit 12, are indicated by the arrows in FIG. 2.

From time t4, the image output unit 13 outputs the image data of ODD1 and then EVEN1, which have been input into the image input unit 12, at a delay of 1 frame. The above descriptions discuss the processing flow with focus placed on the image data in Frame1, the input to the image input unit 12 of which commences at time t0, and this process is repeated by the image processing unit 100 at a cycle approximately 33.3 ms in length.

(Signaling Between Modules)

Figure 3:
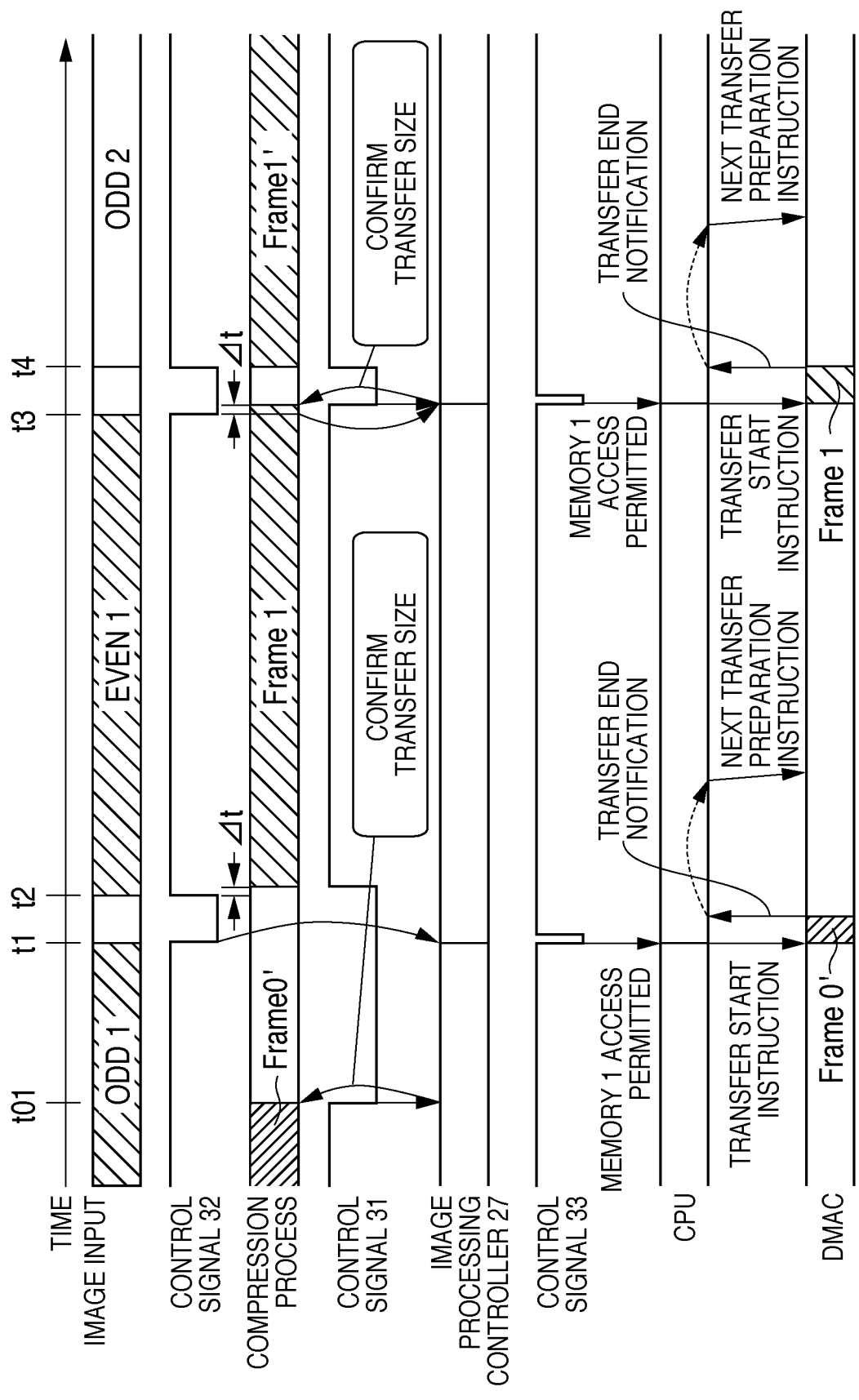
FIG. 3 is a diagram illustrating how the completion of processes performed by an image compression unit and an image input unit is communicated to a DMA controller.

Next, signaling occurring between modules when the image processing apparatus performs operations such as those stated above shall be described with reference to FIG. 3. FIG. 3 is a diagram illustrating how the completion of the processes performed by the image compression unit 14 and the image input unit 12 described with reference to FIG. 2 is communicated to the DMA controller 23.

In FIG. 3, the control signal 32 is a signal indicating whether or not the image input unit 12 is in an image data transfer period. In FIG. 3, the "H" level of the control signal 32 indicates that the image input unit 12 is in the image data transfer period. Meanwhile, the "L" level of the control signal 32 indicates that periods from t1 to t2 and t3 to t4 are non-transfer periods. The "L" level of the control signal 32 is an example of an enabling signal. Meanwhile, the control signal 31 is a signal indicating whether or not the image compression unit 14 is performing a compression process. In FIG. 31, the "H" level of the control signal 31 indicates that the image compression unit 14 is performing a compression process. In this case, the fall of the control signal 31 at time t01 indicates that the compression of the image data for Frame0' has ended and the transfer of the compressed image data to the memory 1 has been completed. Similarly, the fall of the control signal 31 at time t3+Δt indicates that the compression of the image data for Frame1 has ended and the transfer of the compressed image data to the memory 1 has been completed. In other words, "L" level of the control signal 31 indicates that the image compression unit 14 is not performing the compression process.

As shown in FIG. 1, the control signals 31 and 32 are connected to the image processing controller 27. The image processing controller 27 first determines whether or not the compressed image data to be transferred from the memory 1 to the memory 2 has already been prepared in the memory 1 based on the state of the control signal 31. Upon confirming that the image compression process has ended (that the compression process is not underway) based on the fall of the control signal 31 (time t01, or t3+Δt), the image processing controller 27 accesses the image compression unit 14. The image processing controller 27 then acquires the image size of the compressed image data to be transferred from the memory 1 to the memory 2. Here, the image compression unit 14 is accessed via the dedicated control bus 40.

Note that here, the image processing controller 27 monitors the operational states of the image input unit 12 and the image compression unit 14 using the control signals 31 and 32. For example, it can be assumed that the control signal 32 from the image input unit 12 will experience two L periods every 33.3 ms or so, as described earlier in the present embodiment, due to the two ODD and EVEN field data transfers.

Furthermore, it can be assumed that the control signal 31 will fall to L each amount of time required for the compression process performed by the image compression unit 14. The image processing controller 27 has an internal timer function (not shown in the diagrams), and monitors the timing at which the polarity of each control signal reverses. Then, in the case where no change appears in the control signal even if a set period determined by the properties and processing details of each image processing module has passed, it is determined that an abnormality has occurred in the module. In such a case, the image processing controller 27 issues, via the dedicated control bus 40, a module reset and reactivate command to the image processing module in which the abnormality occurred and to other modules that are expected to be affected by that abnormality.

At the same time, the image processing controller 27 notifies the CPU 22 that the image processing module has been reset, via the second bus. Having received the notification, the CPU 22 performs processes, such as image sending processing, as necessary during the period until the image processing has recovered, using the past compressed data already transferred to memory 2.

Note that the set period determined by the properties and processing details of each image processing module can be approximated as follows, using the image compression unit 14 as an example:

$$T(\text{timeout}) = 2 \times \text{MAX}(A + B \times C, D)$$

where A: the image data processing time determined by each compression format (a time independent of the image size, such as the time required for loading, into the image compression unit 14, a program for switching a software processing routine in the image compression unit 14, the time required by operations for generating a header for the image data, and so on);

B: the image data processing time per unit image size determined by each compression format;

C: the image size of one frame of image data to be processed; and

D: the amount of time required to supply the data for that image size to the image processing unit.

In FIG. 2, the processing time for Frame1 is t2 to t3, and this is because the rate of the supply of data for compression to the image compression unit 14 is determined by the time of data transfer from the image input unit 12. In this case, the term "D" in the above equation is applied. However, with respect to the processing time for Frame1' (t4 to t5), the data used for compression is already prepared in the memory 1, and therefore the data transfer time (term "D") does not determine the rate, and thus the term A+B×C is applied. Here, the period until an abnormality is ultimately determined to have occurred is set to twice the stated processing time. This is because when it is apparent that more than twice the time for the estimated processing will be required, the properties of the module that performs the process while also ensuring real-time processing cannot be maintained.

Next, in a state where the compression process is not being carried out, the image processing controller 27 determines, based on the state of the control signal 32, whether or not image input data that is to be given top priority in the image processing is being transferred to the memory 1. In the case where the control signal 32 is "L" (low) (the case where the image input data is not being transferred to the memory 1), the control signal 33 is driven to "L", and the CPU 22 is notified that it is permitted to access the memory 1. Furthermore, the CPU 22 is notified of the image size of the data to be transferred via the second bus 20. These notifications are signals that indicate that image processing is not currently underway, and correspond to signals sent to the CPU 22 giving the instruction for the transfer of image data.

Having been notified of the permission to access the memory 1 via the control signal 33, the CPU 22 notifies the DMA controller 23 of the image size of the compressed image data that is to be transferred via the second bus 20. Furthermore, the CPU 22 instructs the DMA controller 23 to commence the transfer of that data from the memory 1 to the memory 2. Having received the instruction from the CPU 22, the DMA controller 23 accesses the first memory control unit 11 via the second bus 20, reads out the compressed image data of Frame0' from the memory 1, and commences the transfer of that data to the memory 2 at time t1. Similarly, at time t3+Δt, the DMA controller 23 commences the transfer of the data of Frame1.

Note that here, the CPU 22 monitors the operational state of the image processing controller 27 using the control signal 33, in the same manner as the image processing controller 27 monitors the control signals 31 and 32. It can be assumed that the control signal 33 will periodically fall to L due to the emission of image transfer requests. The CPU 22 has an internal timer function (not shown in the diagrams), and monitors the timing at which the polarity of the control signal 33 reverses. Then, in the case where no change appears in the control signal 33 even if a set period determined by the details of the processing requested of the image processing controller 27 has passed, an inquiry is made to the image processing controller 27 via the second bus. In the case where the image processing controller does not return a response or returns a response indicating the occurrence of an abnormality, the CPU 22 resets and reactivates the image processing controller 27.

Note that the "set period determined by the details of the processing requested by the image processing controller 27" can, in the case where, for example, the frame rate for images requested of an external apparatus via a network is E frame/second, be approximated as:

$$T(\text{timeout}) = F \times (1/E)$$

where F: a value determined by two or more system requests.

This is a value that allows a processing delay of up to F times the processing interval for the estimated frame rate, and is determined taking the capacity of the image processing buffer, transmission delay in the network, and so on into consideration.

Of course, this is only one example of the method for determining this value, and the method for determining the wait time until an abnormality is detected can be changed as necessary.

Upon finishing the transfer of the compressed image data, the DMA controller 23 issues a transfer end notification to the CPU 22 via the second bus 20. Upon receiving the transfer end notification, the CPU 22 sets information such as the transfer source starting address, the transfer destination starting address, and so on in the DMA controller 23 in advance (the dotted-line arrows in FIG. 3), in preparation for the next transfer, and stands by.

After the CPU 22 performs a process for adding a header to the compressed image data transferred to the memory 2, the data is transferred from the network control unit 24 to an external network. Because the data in the memory 2 is accessed via the second bus 20, this process is performed independent from the operation of the first bus 10. Therefore, the processes performed by the image processing modules connected to the first bus 10 can be executed without being affected by the operations of the modules connected to the second bus 20.

Although an example where the CPU 22 is notified of the access permission by the image processing controller 27 is described in the present embodiment, the scheme for controlling transfer between memories is not limited thereto. For example, it is also possible to implement the transfer between memories by the image processing controller 27 directly controlling the DMA controller 23 via the second bus 20.

As described thus far, the configuration according to the first embodiment is separated into an image processing system that requires processing within a set amount of time, and a data processing system in which random processing can occur. The data processing system in which random processing can occur performs predetermined processing in accordance with instructions from the image processing system. For this reason, the data processing system in which random processing can occur can easily access the data in the image processing system without disturbing the timing of the processing performed by the image processing system. Therefore, it is easy for this system to simultaneously perform processes whose timings of occurrence are not constant due to external factors, such as network processes, while also ensuring that the image processing is performed in real time.

Furthermore, by providing a bus for controlling the image processing modules (the dedicated control bus 40) separate from the first bus 10 and the second bus 20, it is possible to control the image processing modules without blocking those image processing modules from accessing the memories. This makes it even easier to ensure that the image processing is performed in real time.

Furthermore, by separating the memories into the first memory 1 used mainly for image processing and the second memory 2 used by other systems, it is possible to use memories with speeds and capacities optimal for the respective processing units. It is also possible to achieve a greater reduction in the power consumption of the memory units than with the conventional system.

Furthermore, by using the image processing controller 27 and the CPU 22 to monitor the states of the signals over a time interval based on the processing properties of each module, it is possible to quickly respond to malfunctions in processing modules caused by noise such as static electricity and other factors and reduce the period in which video cannot be processed.

Finally, by separating the memories and buses into the first memory 1 and first bus 10 used mainly for image processing and the second memory 2 and second bus 20 used by other systems, it is possible to selectively perform processes such as resetting only on modules related to image processing. Through this, when a malfunction has occurred in an image processing unit, it is possible to selectively reset only the necessary processing units, rather than resetting the entire system including the OS.

<Second Embodiment>

The second embodiment illustrates an example of a configuration in which the CPU 22 directly determines the permission to access the first memory 1 via an interrupt control unit 28, serving as an interrupt control unit connected to the second bus 20, and controls the DMA controller 23. Because the configuration of the present embodiment has many elements common with the configuration of the first embodiment, the same basic diagrams, reference numerals, and so on shall be applied here as well; only the differing areas shall be described in detail.

(Configuration of Image Processing Apparatus)

Figure 4:
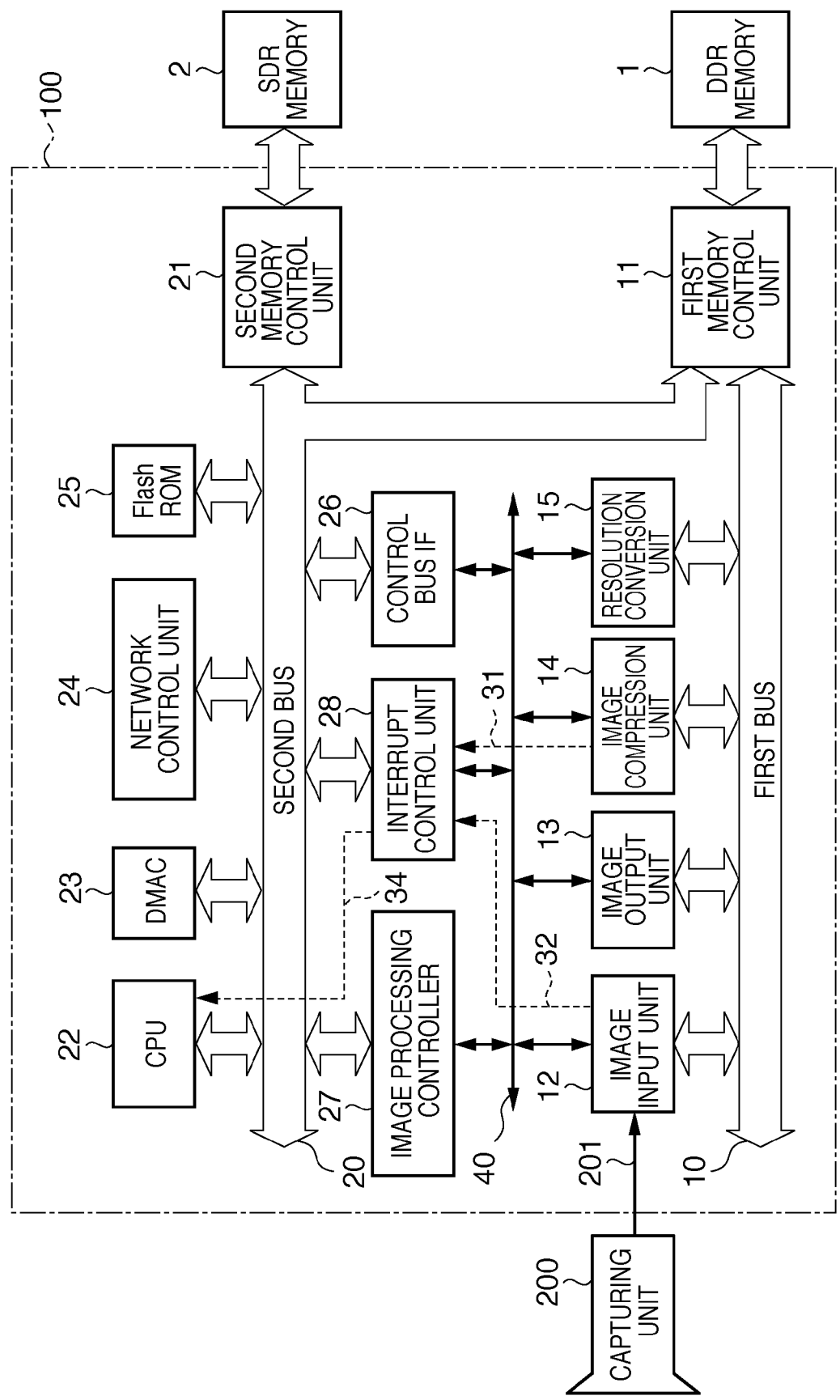
FIG. 4 is a diagram illustrating the configuration of an image processing apparatus.

FIG. 4 is a diagram illustrating the configuration of an image processing apparatus according to the present embodiment. The configuration of the present embodiment is almost identical to that shown in FIG. 1 in the first embodiment; however, the interrupt control unit 28 has been connected to the second bus 20. Furthermore, the control signal 31 from the image compression unit 14 and the control signal 32 from the image input unit 12 are connected to the interrupt control unit 28. In addition, an INT signal 34 is connected from the interrupt control unit 28 to the CPU 22.

Here, the INT signal 34 is a signal indicating that an interrupt has occurred in the interrupt control unit 28. The INT signal 34 is driven to "L" (low) when an interrupt has occurred, and is cleared to "H" (high) when the cause of the interrupt is read from the interrupt control unit 28 by the CPU 22. The general processing flow in the second embodiment is the same as in the first embodiment, and thus descriptions thereof shall be omitted here.

(Signaling Between Modules)

Figure 5:
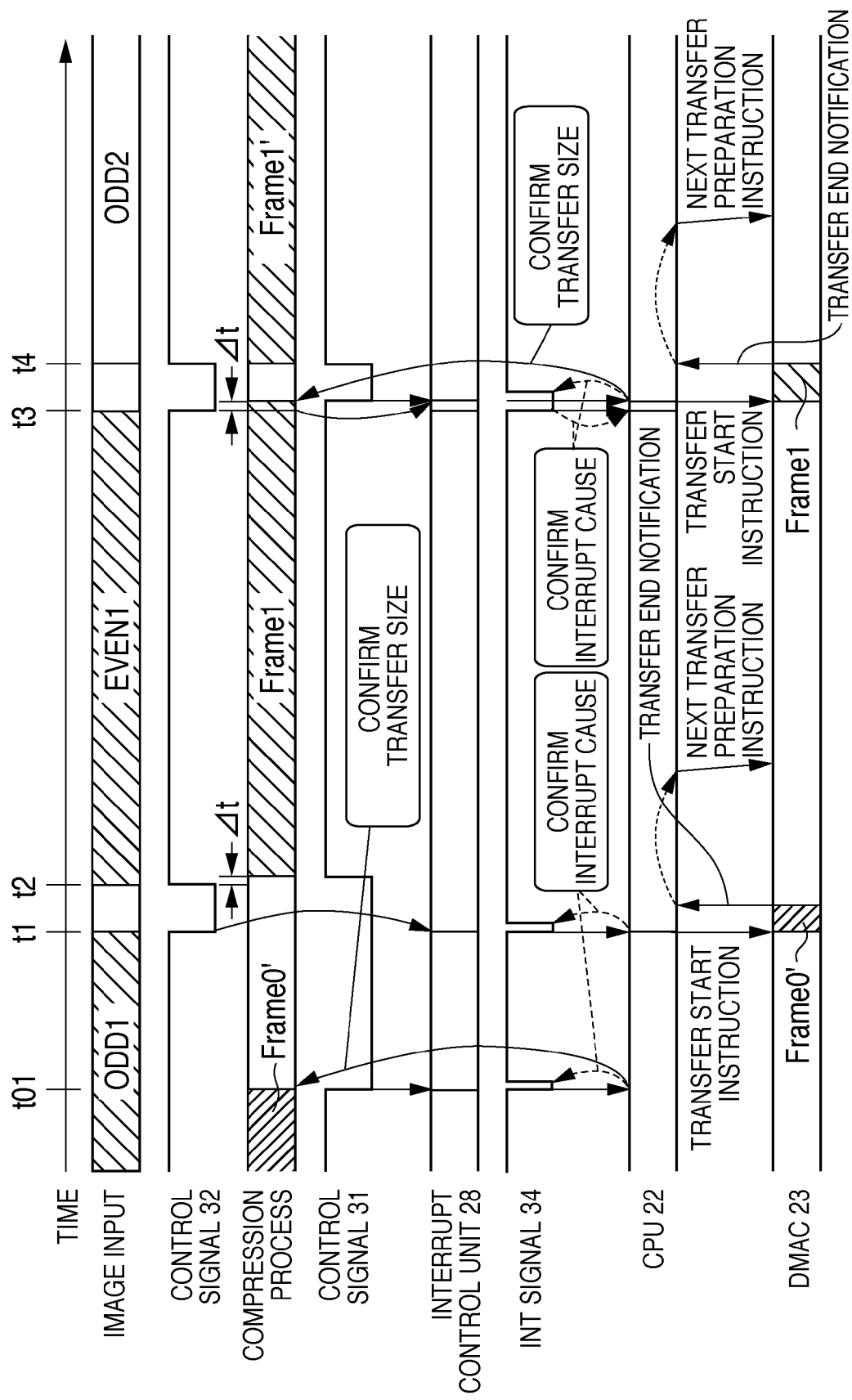
FIG. 5 is a diagram illustrating how the completion of processes performed by an image compression unit and an image input unit is communicated to a DMA controller via an interrupt control unit 28.

Next, the signaling between the various modules of which the image processing apparatus is configured shall be described with reference to FIG. 5. FIG. 5 is a diagram illustrating how the completion of the processes performed by the image compression unit 14 and the image input unit 12 described with reference to FIG. 2 is communicated to the DMA controller 23 via the interrupt control unit 28.

In FIG. 5, the control signal 32 is a signal indicating whether or not the image data output from the image input unit 12 is in a transfer period. In FIG. 5, the "H" level of the control signal 32 indicates that the image input unit 12 is in the transfer period. In this case, the periods from t1 to t2 and t3 to t4 are non-transfer periods. Meanwhile, the control signal 31 is a signal indicating whether or not the image compression unit 14 is performing a compression process. Here, the "H" level of the control signal 31 indicates that the image compression unit 14 is performing a compression process. In this case, the fall of the control signal 31 at time t01 indicates that the compression of the image data for Frame0' has ended and the transfer of the compressed image data to the memory 1 has been completed. Similarly, the fall of the control signal 31 at time t3+Δt indicates that the compression of the image data for Frame1 has ended and the transfer of the compressed image data to the memory 1 has been completed.

As shown in FIG. 4, the control signals 31 and 32 are connected to the interrupt control unit 28. The interrupt control unit 28 detects the state of the control signal 31. Upon detecting that the image compression process has ended based on the fall of the control signal 31 (at time t01 or t3+Δt), the interrupt control unit 28 drives the INT signal 34 to "L" and notifies the CPU 22 of the interrupt. Having been notified of the interrupt, the CPU 22 accesses the interrupt control unit via the second bus 20 (the dotted line arrows in FIG. 5), and confirms that the cause of the interrupt that occurred is the end of the processing performed by the image compression unit 14. Having been accessed by the CPU 22, the interrupt control unit 28 drives the level of the INT signal 34 to "H", thereby removing the interrupt state. Meanwhile, having confirmed that the compression process performed by the image compression unit 14 has ended, the CPU 22 accesses the image compression unit 14 from the control bus IF 26 via the dedicated control bus 40, and acquires information regarding the size of the compressed image data to be transferred from the memory 1 to the memory 2.

Note that here, the CPU 22 monitors the operational states of the image input unit 12 and the image compression unit 14 using the INT signal 34. The CPU 22 has an internal timer function (not shown in the diagrams) corresponding to each processing unit, and reactivates that timer based on the interrupt cause as confirmed as a result of accessing the interrupt control unit 28 in accordance with the INT signal 34. Then, in the case where the corresponding INT signal 34 does not appear even if a set period determined by the properties and processing details of each image processing module has passed, it is determined that an abnormality has occurred in the module. In such a case, the CPU 22 issues, from the control bus IF 26 and via the dedicated control bus 40, a module reset and reactivate command to the image processing module in which the abnormality occurred and to other modules that are expected to be affected by that abnormality. The subsequent resetting operations and abnormality detection time settings are almost identical to those in the first embodiment, and thus descriptions thereof shall be omitted.

In addition, the interrupt control unit 28 detects the states of the control signals 32 and 31 in the same manner. In the case where the control signal 32 has been detected as falling (the case where the transfer of the image input data to the memory 1 has ended), the INT signal 34 is driven to "L", and the CPU 22 is notified of the interrupt. Having been notified of the interrupt, the CPU 22 accesses the interrupt control unit via the second bus 20 (the upward-facing dotted line arrows in FIG. 5), and confirms that the cause of the interrupt that occurred is the end of the data transfer processing performed by the image input unit 12. Having been accessed by the CPU 22, the interrupt control unit 28 drives the level of the INT signal 34 to "H", thereby removing the interrupt state.

Upon confirming both the end of the compression process and the end of the data transfer, the CPU 22 determines that the memory 1 can be accessed with no problems (that is, that image processing is not currently being performed). Then, the CPU 22 notifies the DMA controller 23 of the size of the compressed image data to be transferred via the second bus 20. Furthermore, the CPU 22 instructs the DMA controller 23 to commence the transfer of that data from the memory 1 to the memory 2. Having received the instruction from the CPU 22, the DMA controller 23 accesses the first memory control unit 11 via the second bus 20, reads out the compressed image data of Frame0' from the memory 1, and commences the operation for transferring that data to the memory 2 at time t1. Similarly, at time t3+Δt, the DMA controller 23 commences the transfer of the data of Frame1.

Upon finishing the transfer of the compressed image data, the DMA controller 23 issues a transfer end notification to the CPU 22 via the second bus 20. Upon receiving the transfer end notification, the CPU 22 sets information such as the transfer source starting address, the transfer destination starting address, and so on in the DMA controller 23 in advance (the dotted-line arrows in FIG. 5), in preparation for the next transfer, and stands by.

After the CPU 22 performs a process for adding a header to the compressed image data transferred to the memory 2, the data is transferred from the network control unit 24 to an external network. Because the data in the memory 2 is accessed via the second bus 20, this process is performed independent from the operation of the first bus 10. Therefore, the processes performed by the image processing modules connected to the first bus 10 can be executed without being affected by the operations of the modules connected to the second bus 20.

Although an example where the CPU 22 is notified of the states of the image processing modules using the INT signal from the interrupt control unit 28 is described in the present embodiment, the scheme for implementing the transfer between memories is not limited thereto. For example, it is also possible to implement the transfer between memories by inputting a different control signal from the interrupt control unit 28 directly to the DMA controller 23. In such a case, the transfer can be implemented by the CPU 22 setting the transfer destination address and so on in advance, the interrupt control unit generating the timing at which to commence the transfer between memories based on the states of the control signals 31 and 32, and the DMA controller 23 being driven by the stated other control signal.

As described thus far, the configuration according to the second embodiment is separated into an image processing system that is required to perform processing within a set amount of time, and a data processing system in which random processing can occur. The data processing system in which random processing can occur performs predetermined processing in accordance with instructions from the image processing system. For this reason, the data processing system in which random processing can occur can easily access the data in the image processing system without disturbing the timing of the processing performed by the image processing system. Therefore, it is easy for this system to simultaneously perform processes whose timings of occurrence are not constant due to external factors, such as network processes, while also ensuring that the image processing is performed in real time.

In particular, in the present embodiment, the interrupt control unit 28 that outputs an interrupt signal to the CPU 22 using the INT signal 34 is provided, making it possible for the image processing controller 27 to focus on controlling the operations of the image processing modules (12, 13, 14, 15).

Furthermore, by providing a bus for controlling the image processing modules (the dedicated control bus 40) separate from the first bus 10 and the second bus 20, it is possible to control the image processing modules without blocking those image processing modules from accessing the memories. This makes it even easier to ensure that the image processing is performed in real time.

Furthermore, by separating the memories into the first memory 1 used mainly for image processing and the second memory 2 used by other systems, it is possible to use memories with speeds and capacities optimal for the respective processing units. It is also possible to achieve a greater reduction in the power consumption of the memory units than with the conventional system.

Furthermore, by using the CPU 22 to monitor the state of the INT signal over a time interval based on the processing properties of each image processing module, it is possible to quickly respond to malfunctions in image processing modules caused by noise such as static electricity and other factors and reduce the period in which video cannot be processed.

Finally, by separating the memories and buses into the first memory 1 and first bus 10 used mainly for image processing and the second memory 2 and second bus 20 used by other systems, it is possible to selectively perform processes such as resetting only on image processing modules. Through this, when a malfunction has occurred in an image processing unit, it is possible to selectively reset only the necessary processing units, rather than resetting the entire system including the OS.

<Third Embodiment>

The third embodiment describes a configuration in which the image processing controller 27 issues permission to access the memory 1 to the CPU 22 based on the states of control signals 31, 32, 35, and 36, indicating the processing statuses of the respective modules connected to the first bus 10. Because this configuration has many elements common with the configuration of the first embodiment, the same basic diagrams, reference numerals, and so on shall be applied here as well; only the differing areas shall be described in detail. Note also that details of the control that uses the control signal 36 shall be described in the following fourth embodiment.

(Configuration of Image Processing Apparatus)

Figure 6:
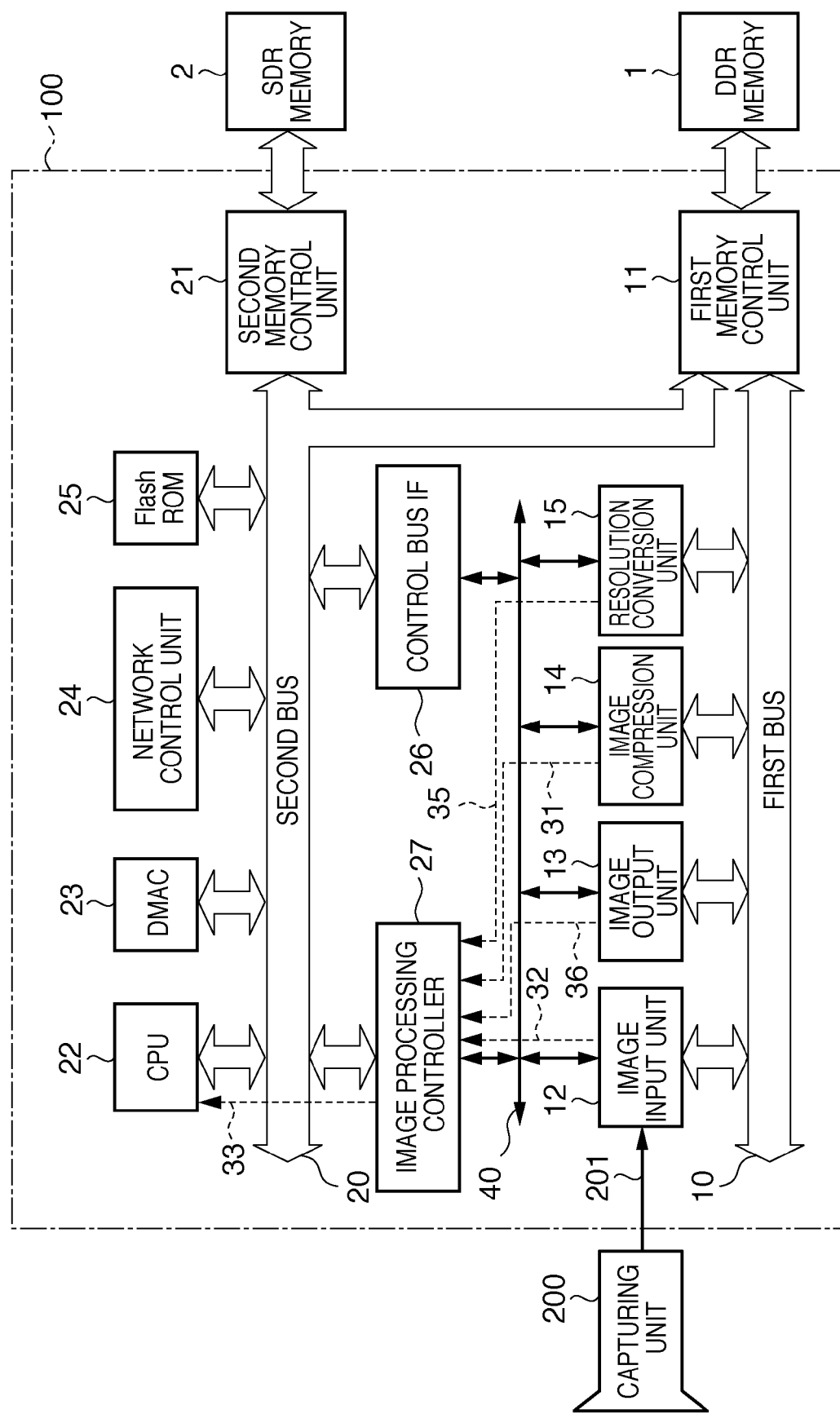
FIG. 6 is a diagram illustrating the configuration of an image processing apparatus.

FIG. 6 is a diagram illustrating the configuration of an image processing apparatus according to the present embodiment. The configuration of the present embodiment is almost identical to that in the first embodiment; however, the control signal 35 is connected to the image processing controller 27 from the resolution conversion unit 15, and the control signal 36 is connected to the image processing controller 27 from the image output unit 13.

(Outline of Operations)

Figure 7:
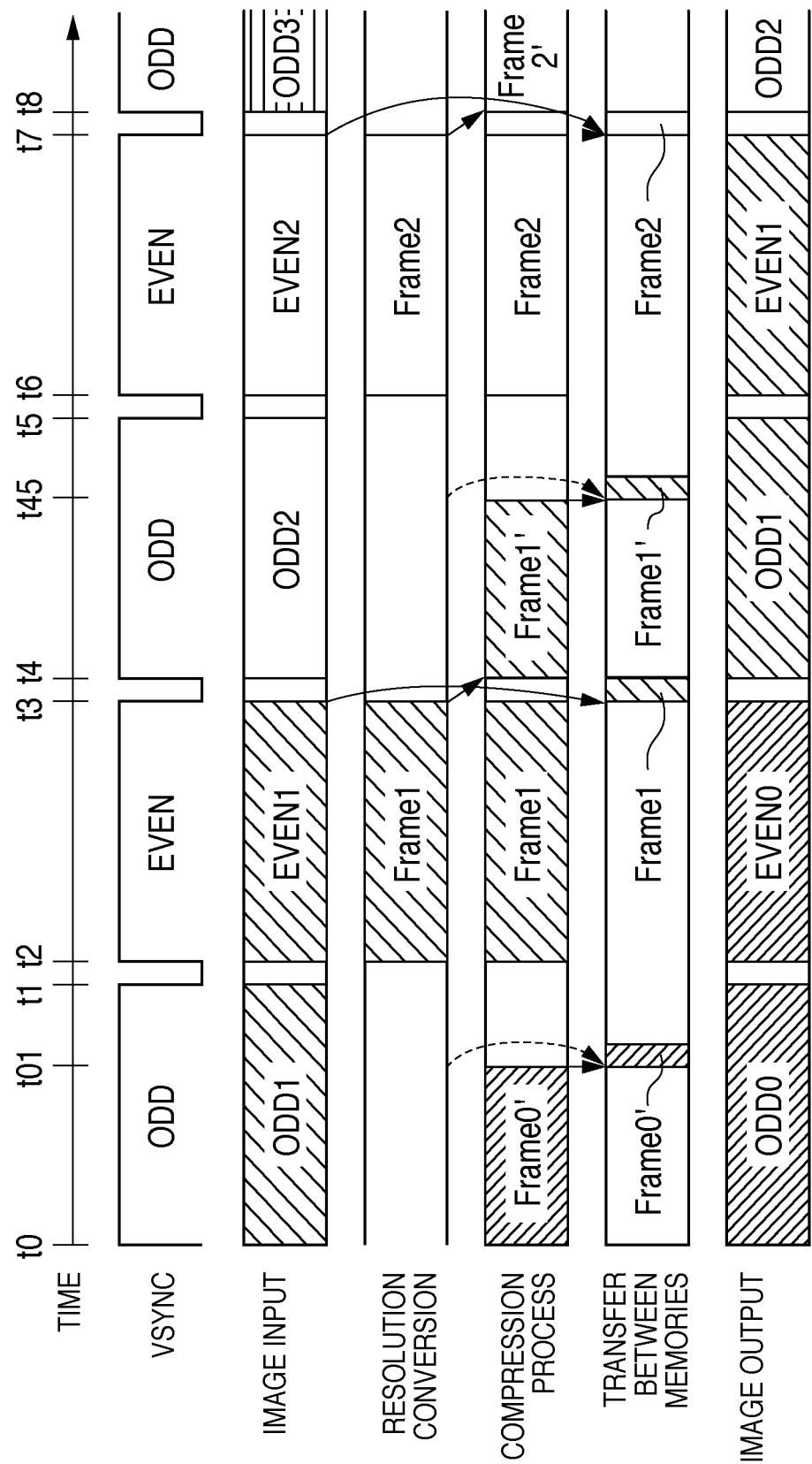
FIG. 7 is a timing chart illustrating an operation example of an image processing apparatus.

The general processing flow in the third embodiment is illustrated in FIG. 7. Although this timing chart is almost identical to the timing chart shown in FIG. 2 with respect to the first embodiment, the timing of the occurrence of the transfer between memories when handling resolution-converted image data differs from that in the first embodiment. In FIG. 2 in the first embodiment, the transfer between memories is always commenced at a timing when the transfer of image input data is not underway. As opposed to this, in FIG. 7, immediately after the compression of a reduced image generated through resolution conversion (Frame0' and Frame1') has ended (t01 and t45), the compressed data is transferred between the memories.

(Signaling Between Modules)

Figure 8:
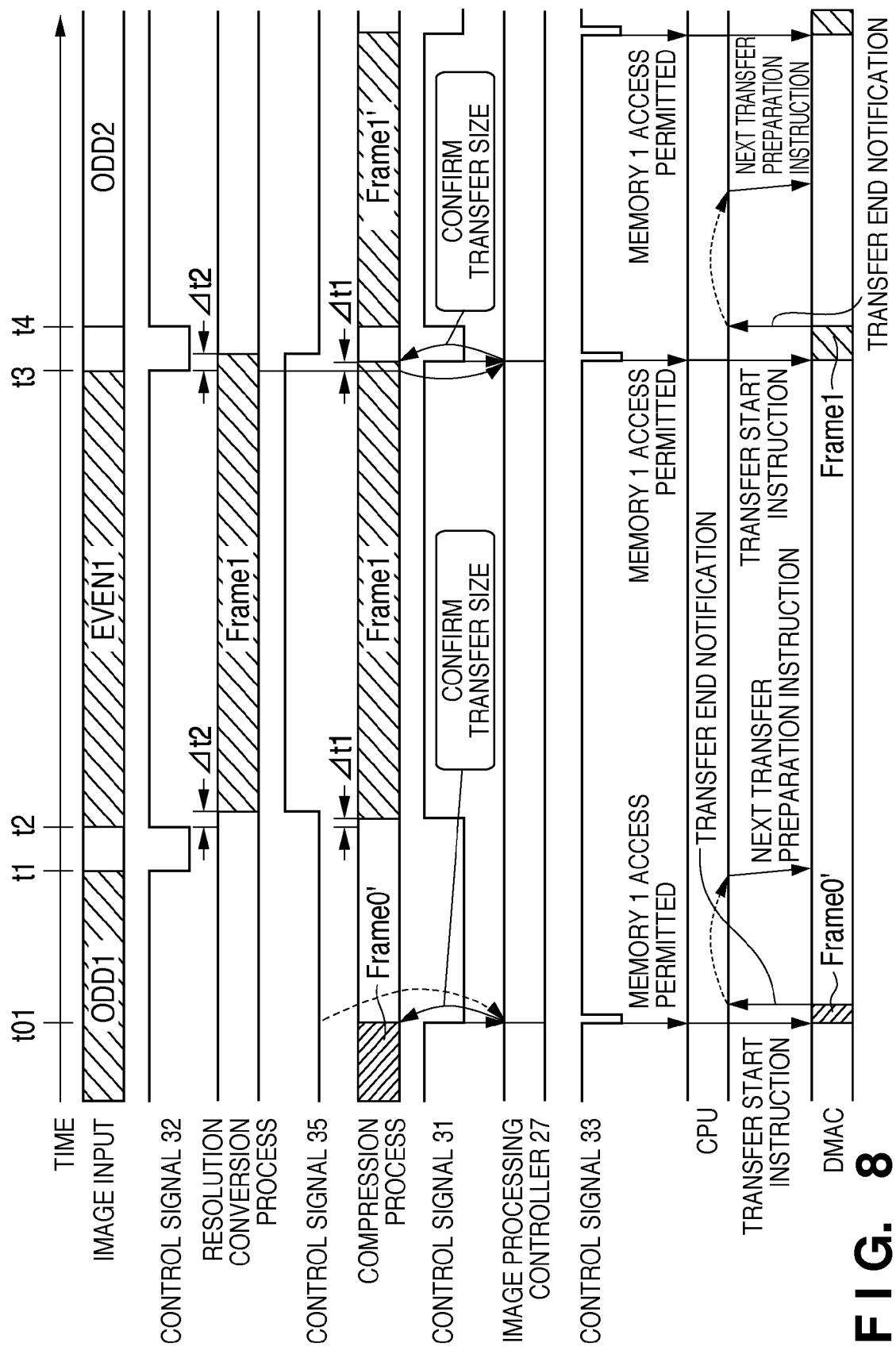
FIG. 8 is a diagram illustrating details regarding the timing of transfer between memories.

FIG. 8 is a diagram illustrating the details of the timing of the transfer between memories described above with reference to FIG. 7. In FIG. 8, the control signal 32 is a signal indicating whether or not the image data output from the image input unit 12 is in a transfer period. In FIG. 8, the transfer period is indicated by the "H" level. Therefore, in the example shown in FIG. 8, the periods t1 to t2 and t3 to t4 are non-transfer periods. Meanwhile, the control signal 31 is a signal indicating whether or not the image compression unit 14 is performing a compression process. Here, the "H" level of the control signal 31 indicates that the image compression unit 14 is performing a compression process.

Meanwhile, the control signal 35 is a signal indicating whether or not the resolution conversion unit 15 is performing a resolution conversion process. Here, the "H" level of the control signal 35 indicates that the resolution conversion unit 15 is performing a resolution conversion process. In this case, the fall of the control signal 31 at time t01 indicates that the compression of the image data for Frame0' has ended and the transfer of the compressed image data to the memory 1 has been completed. At that same time t01, the control signal 35 is at the "L" level, indicating that the resolution conversion unit 15 is not currently performing processing. Meanwhile, the state of the control signal 35 is put into the "H" level for the period from time t2+Δt2 to t3+Δt2, indicating that the resolution conversion unit 15 is currently performing processing.

As shown in FIG. 6, the control signals 31, 32, and 35 are connected to the image processing controller 27. The image processing controller 27 first determines whether or not the compressed image data to be transferred from the memory 1 to the memory 2 has already been prepared in the memory 1 based on the state of the control signal 31. Upon confirming that the image compression process has ended based on the fall of the control signal 31 (time t01, or t3+Δt1), the image processing controller 27 accesses the image compression unit 14 via the dedicated control bus 40. The image processing controller 27 then acquires the image size of the compressed image data to be transferred from the memory 1 to the memory 2.

Next, the image processing controller 27 determines what sort of processing status the various image processing modules connected to the first bus 10 are in based on the states of the control signals 32 and 35. Then, in the case where, for example, the control signal 32 is "L" (the case where the image input data is not being transferred to the memory 1), the control signal 33 is driven to "L", and the CPU 22 is notified that it is permitted to access the memory 1. Furthermore, the CPU 22 is notified of the image size of the data to be transferred via the second bus 20 (time t3+Δt1).

In the case where the control signal 32 is "H" (the case where the image input data is being transferred to the memory 1), the data transmission load in the first bus 10 is determined based on the states of the other control signals, and whether or not the memory 1 can be permitted to be accessed is determined. For example, at time t01, the control signal 35 is driven to "L", and thus the resolution conversion unit 15 is not performing a resolution conversion process. In this case, the data transmission load in the first bus 10 is lower by the same amount as the resolution conversion process, which is not being carried out, and thus the image processing controller 27 determines that the compressed data can be transferred with no problems. Then, the image processing controller 27 notifies the CPU 22 that access to the memory 1 is permitted, and notifies the CPU 22 of the size of the image to be transferred via the second bus 20 (time t01). The operations thereafter are the same as in the first embodiment and thus descriptions thereof shall be omitted.

Although an example where the CPU 22 is notified of the access permission by the image processing controller 27 based on the states of the control signals from the respective image processing modules is described in the present embodiment, the standard for issuing transfer permission is not limited only to issuance based on the states of the control signals. For example, whether or not access is to be permitted may be determined based on a combination of the values of parameters set by the image processing controller 27 for instructing the various image processing modules to perform specific processes (for example, image sizes, processing rates, and so on) and the states of the control signals that indicate the statuses of those processes.

With the configuration according to the third embodiment as described thus far, the image processing controller 27 receives control signals not only from the image input unit 12 and the image compression unit 14 but also from other image processing modules (13, 15), thereby performing operational control with higher accuracy. For this reason, with the configuration of the present embodiment, the permission to access the memory 1 can be issued in a more flexible manner. Accordingly, it is even easier for other processing systems to access the data in the image processing system without disturbing the timing of the processing performed by the image processing system.

<Fourth Embodiment>

The fourth embodiment describes an example in which the data transfer between the memory 2 and the memory 1 includes not only data transfer from the memory 1 to the memory 2 but also data transfer from the memory 2 to the memory 1. Because this configuration has many elements common with the configuration of the first embodiment, the same basic diagrams, reference numerals, and so on shall be applied here as well; only the differing areas shall be described in detail.

(Configuration of Image Processing Apparatus)

Figure 9:
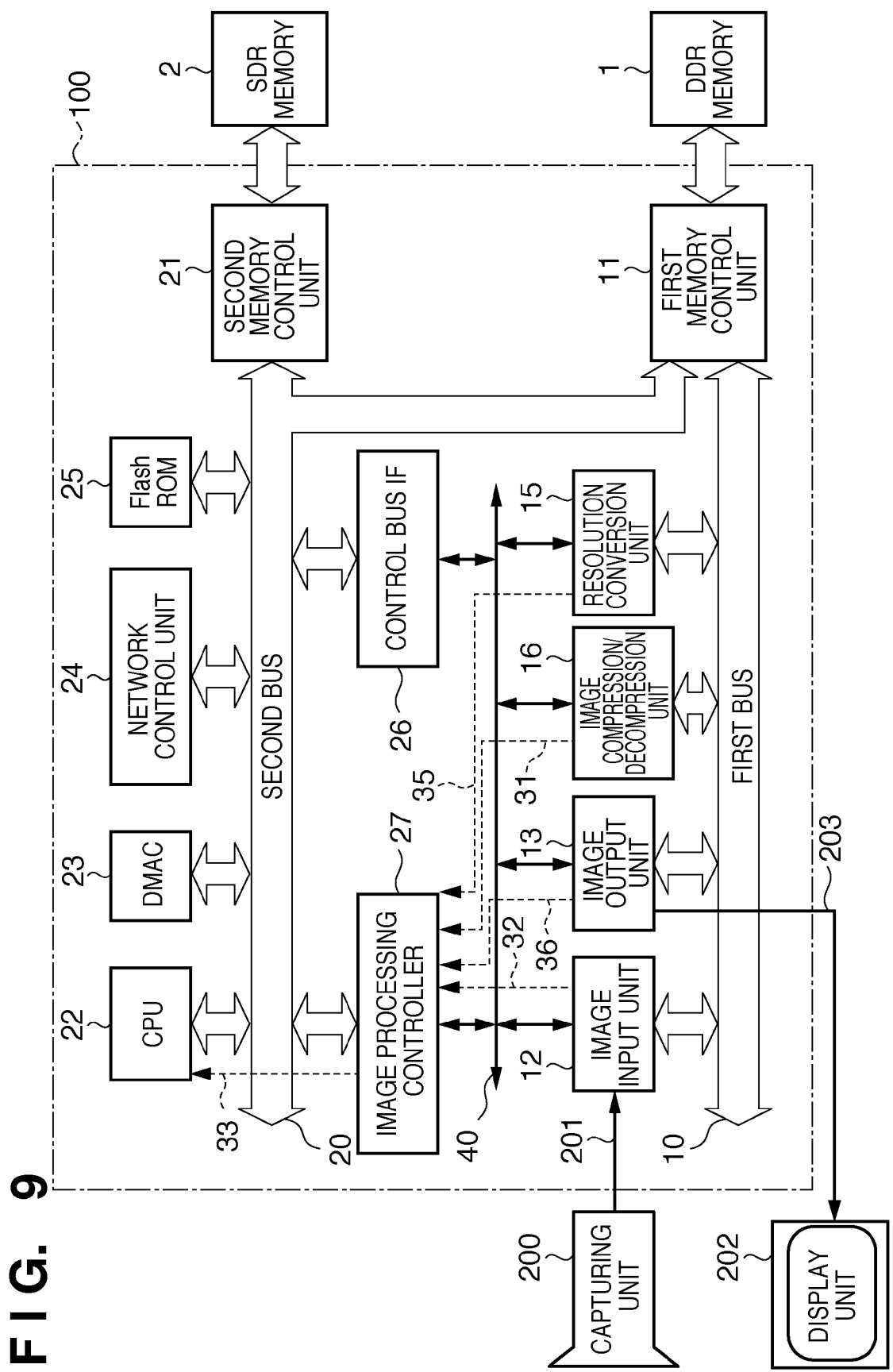
FIG. 9 is a diagram illustrating the configuration of an image processing apparatus.

FIG. 9 is a diagram illustrating the configuration of an image processing apparatus according to the present embodiment. The configuration of the present embodiment is almost identical to that in the first embodiment; however, the control signal 35 is connected to the image processing controller 27 from the resolution conversion unit 15, and the control signal 36 is connected to the image processing controller 27 from the image output unit 13. Furthermore, a display unit 202 is connected to the image output unit 13 via a video output signal line 203. Moreover, an image compression/decompression unit 16 is connected to the first bus 10 instead of the image processing module denoted as the image compression unit 14 in FIG. 1.

(Outline of Operations)

Figure 10:
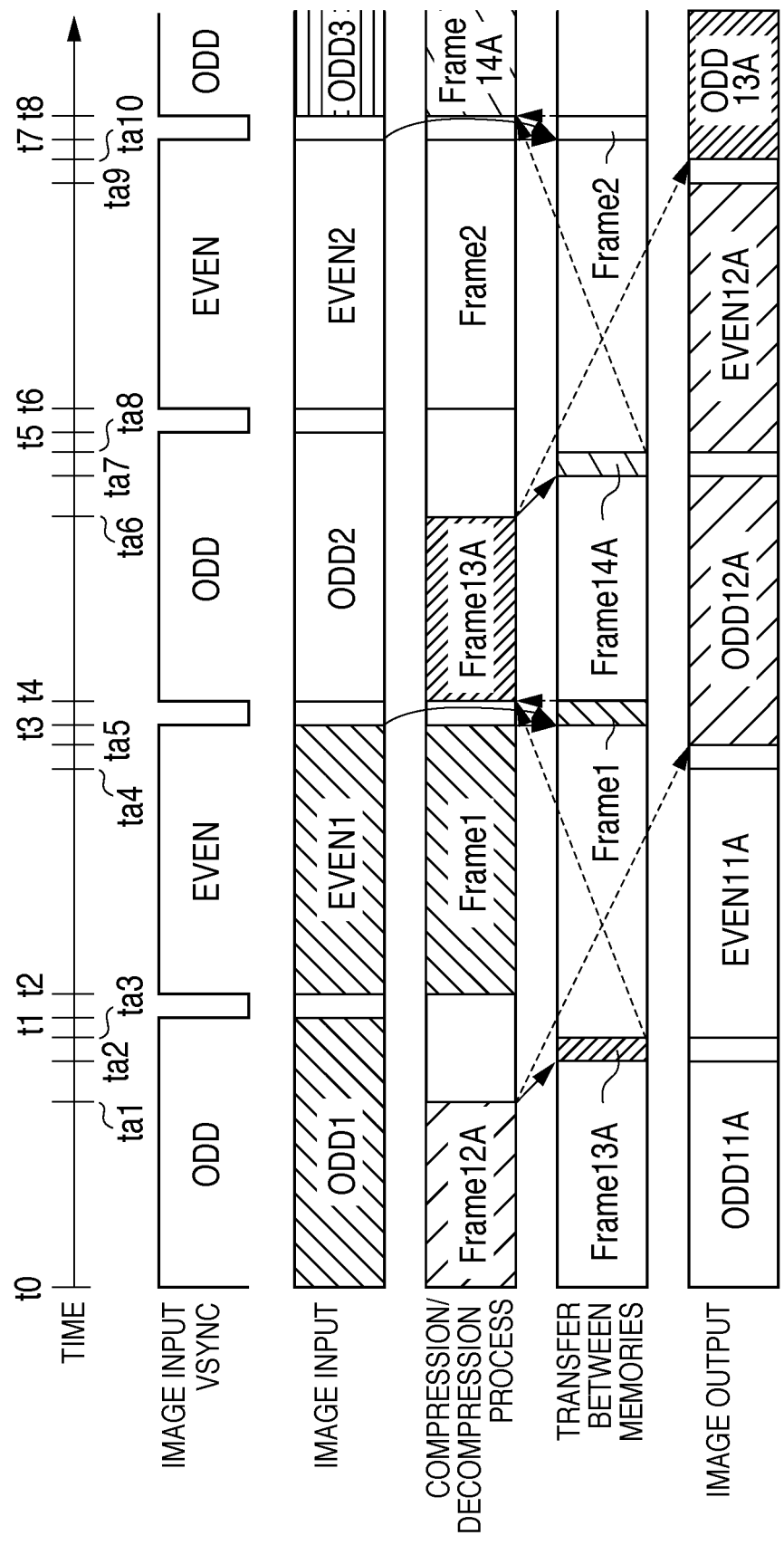
FIG. 10 is a timing chart illustrating an operation example of an image processing apparatus.

The general processing flow in the fourth embodiment is illustrated in FIG. 10. With respect to the process for compressing the input image data, FIG. 10 is the same as the timing chart in FIG. 2 described in the first embodiment. However, FIG. 10 differs from FIG. 2 in that an image decompression process for image output is performed by the image compression/decompression unit 16, the data for this decompression is transferred between memories, and the decompressed data for this decompression is output.

In FIG. 10, items to which the letter "A" has been added following the data number, such as Frame12A, Frame13A, ODD11A, and ODD12A, indicate data processing for video output. For example, the decompression process for the image data of Frame12A commenced at time t0 ends at time ta1. Thereafter, upon reaching the timing ta2 after no data for image output has been transferred for a while, the image processing controller 27 issues an instruction, and the data for decompression for the next Frame13A is transferred from the memory 2 to the memory 1.

Upon reaching the timing t4 at which the decompression of the next image is to commence, the data for decompression for the Frame13A transferred to the memory 1 is input into the image compression/decompression unit 16, and the decompression process is executed. The data on which the decompression process is executed from time t4 to ta6 is once again saved in the memory 1, and is then outputted to the display unit 202 from the image output unit 13 via the video output signal line 203 after standing by until the starting time of the next video output timing, or ta10.

On the other hand, the image data of Frame12A, whose decompression process ended at time ta1, is saved in the memory 1 until time ta5 arrives. Then, the ODD field data of the Frame12A, or ODD12A, is output from the image output unit 13 from time ta5 to ta7, and the EVEN field data of the Frame12A, or EVEN12A, is outputted from the image output unit 13 from time ta8 to ta9.

(Signaling Between Modules)

Figure 11:
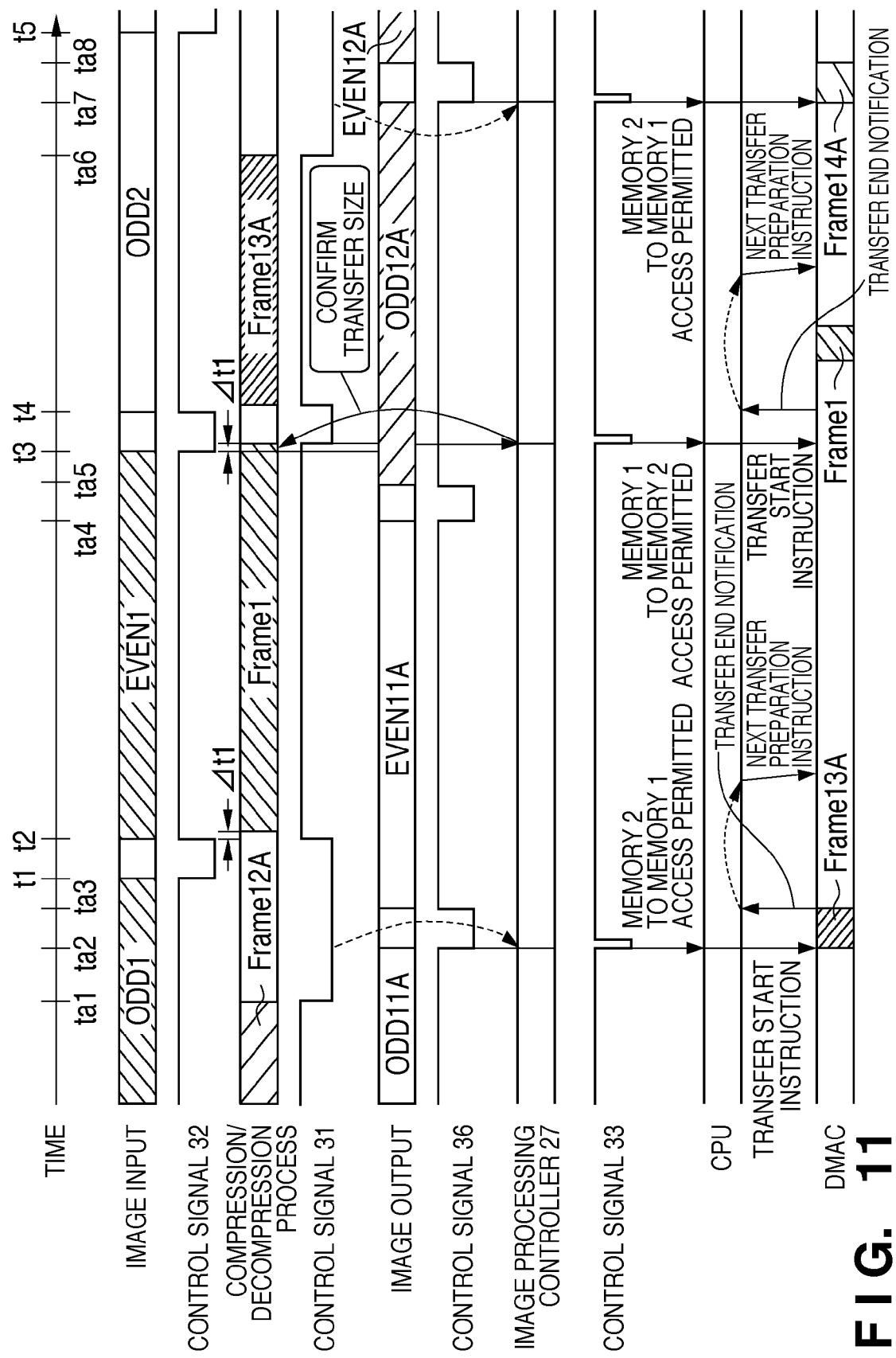
FIG. 11 is a diagram illustrating the signaling details regarding the timing of transfer between memories.

FIG. 11 is a diagram illustrating the details of signaling for the timing of the transfer between memories described above with reference to FIG. 10. In FIG. 11, the control signal 32 is a signal indicating whether or not the image data outputted from the image input unit 12 is in a transfer period. In FIG. 11, the transfer period is indicated by the "H" level. Therefore, in the example shown in FIG. 11, the periods t1 to t2 and t3 to t4 are non-transfer periods. Meanwhile, the control signal 31 is a signal indicating whether or not the image compression/decompression unit 16 is performing a compression or decompression process. Here, the "H" level indicates that the image compression/decompression unit 16 is performing a process. Meanwhile, the control signal 36 is a signal indicating whether or not the system is currently in a transfer period for the image data outputted from the image output unit 13. In FIG. 11, the "H" level of the control signal 36 indicates that the system is in the transfer period. In this case, the periods from ta2 to ta3, ta4 to ta5, and ta7 to ta8 are non-transfer periods.

In FIG. 11, the fall of the control signal 31 at time ta1 indicates that the decompression of the image data of Frame12A has ended and that the transfer of the decompressed data to the memory 1 has ended. In the same time ta1, the control signals 32 and 36 are at the "H" level, indicating that the image input unit 12 and image output unit 13 are both currently transferring data.

As shown in FIG. 9, the control signals 31, 32, and 36 are connected to the image processing controller 27. The image processing controller 27 determines whether or not the image compression/decompression unit 16 is currently performing processing based on the state of the control signal 31. In other words, in the case where the control signal 31 has fallen and the image process performed immediately previous was an image decompression process (time ta1 or time ta6), the image processing controller 27 confirms that the image decompression process has ended.

Upon confirming that the image decompression process has ended, the image processing controller 27 determines what sort of processing status the various image processing modules connected to the first bus 10 are in based on the states of the control signals 32 and 36. Then, in the case where, for example, time ta2 has arrived and the control signal 36 has been detected as having changed to "L" (the image data is not being transferred from the memory 1 to the image output unit 13), the control signal 33 is driven to "L". Through this, the CPU 22 is notified that the transfer of the data used in the next image decompression from the memory 2 to the memory 1 is permitted.

Having received the transfer permission notification, the CPU 22 instructs the DMA controller 23 to transfer the data used in the next image decompression process (Frame13A in ta2, Frame14A in ta6) from the memory 2 to the memory 1. Having received the transfer instruction, the DMA controller 23 DMA-transfers the data from the memory 2 to the memory 1 using the second bus 20. Upon the DMA transfer ending, the DMA controller 23 issues a transfer end notification to the CPU 22. Having detected the transfer end notification, the CPU 22 determines the address and so on of the data to be decompressed at the next timing, based on packet reception information and so on provided by the network control unit 24. Then, various settings are performed as necessary in advance with respect to the registers in the DMA controller 23, in preparation for the next transfer.

However, in the case where the immediately previous image process was an image compression process based on the fall of the control signal 31 (time t3+Δt1), the image processing controller 27 confirms that the image compression process has ended. Then, the image processing controller 27 determines the processing statuses of the various image processing modules connected to the first bus 10 based on the states of the control signals 32 and 36.

Because the control signal 32 is already "L" at time t3+Δt1, it can be seen that image output data is not being transferred from the memory 1 to the image output unit 13. In such a case, the control signal 33 is driven to "L", and the CPU 22 is notified of permission to transfer the compressed data (Frame1) from the memory 1 to the memory 2. The operations in this case are the same as in the first embodiment and thus descriptions thereof shall be omitted.

Although an example where the CPU 22 is notified of the access permission by the image processing controller 27 based on the states of the control signals from the respective image processing modules is described in the present embodiment, this scheme is not limited thereto. That is, the standard based on which the image processing controller 27 determines whether or not to issue the transfer permission is not stipulated only by the states of the control signals. For example, whether or not access is to be permitted may be determined based on a combination of the values of parameters set by the image processing controller 27 for instructing the various image processing modules to perform specific processes (for example, image sizes, processing rates, and so on) and the states of the control signals that indicate the statuses of those processes.

According to the fourth embodiment as described thus far, image data is transferred from the second memory 2 to the first memory 1 during a period in which the memory access that accompanies the image processing performed by the image processing modules (12, 13, 14, 15) is less than in other periods. For this reason, it is possible for other processing systems to access the memories in the image processing system and read/write data therefrom/thereto without disturbing the timing of the processing performed by the image processing system.

According to the present invention, it is possible to provide a technique that makes it possible to simultaneously perform processes whose timings of occurrence are not constant, such as network processes, while also ensuring that image processing is performed in real time.

Furthermore, according to the present invention, it is possible to provide a technique to make it possible to quickly detect the occurrence of problems in processing modules and enable only the necessary modules to recover from abnormal statuses by using the cyclical nature of image processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-294880, filed on Nov. 13, 2007, which is hereby incorporated by reference herein in its entirety.

What is claimed is:

1. An image processing apparatus comprising:
  image processing units adapted to process image data;
  a first memory that stores image data that has been processed by said image processing units;
  a first bus that transfers the image data between said image processing units and said first memory;

a second memory that stores image data transferred from said first memory;

a second bus connected to said first memory and said second memory;

a detection unit adapted to detect processing states of said image processing units; and a control unit adapted to control the transfer of the image data processed by a first of said image processing units and stored in said first memory to said second memory, based on the processing state of a second of said image processing units, wherein the image data is transferred from said first memory to said second memory by said second bus under the control by said control unit.

2. The image processing apparatus according to claim 1, wherein each of said image processing units outputs a control signal indicating the processing state of said image processing unit to said detection unit, and said detection unit detects the end of the image processing based on the control signal received from said image processing unit, outputs a signal to said control unit for accessing said first memory based on the detection of the end of the image processing, and reactivates said image processing unit in the case where a time according to a processing time determined by each compression format of said image processing units, a processing time for the image data per unit image size determined by each compression format, a size of the image data to be processed, and a time required to supply data of the image size to said image processing unit is exceeded.

3. The image processing apparatus according to claim 1, further comprising a control bus adapted to perform signaling between said image processing units and said detection unit.

4. The image processing apparatus according to claim 1, further comprising an interrupt control unit adapted to output, to said control unit, an interrupt signal serving as a signal indicating that the image processing is not being performed, wherein each of said image processing units outputs a control signal indicating the processing states of said image processing unit to said interrupt control unit, and said interrupt control unit detects an end of the image processing based on the control signal received from said image processing unit, and instructs said control unit to perform the transfer using the interrupt signal upon detecting the end of the image processing.

5. The image processing apparatus according to claim 4, further comprising a control bus adapted to perform signaling between said image processing units and said interrupt control unit.

6. The image processing apparatus according to claim 1, wherein said control unit is connected to said second bus, and includes a CPU and a DMA controller.

7. The image processing apparatus according to claim 6, further comprising a control bus IF which is connected to said second bus and a control bus and performs signaling between said CPU and said image processing units.

8. The image processing apparatus according to claim 1, wherein said image processing units process the image data obtained from a capturing unit.

9. The image processing apparatus according to claim 1, wherein the image processing performed by said image processing units includes at least one of a process for transferring an inputted image, a process for compressing an image, a process for decompressing an image, and a process for converting the resolution of an image.

10. The image processing apparatus according to claim 1, further comprising an output unit adapted to output the image data stored in said second memory to an external apparatus.

11. The image processing apparatus according to claim 1, wherein said control unit monitors an interval of transfer requests for the image data from said first memory and determines whether or not the interval is wider than an amount of time according to a frame rate of the image data requested by an external device via a network has been reached, inquires with said detection unit in the case where it has been determined that that the interval is wider than the amount of time according to the frame rate, and reactivates said detection unit in the case where there is no response from said detection unit.

12. The image processing apparatus according to claim 1, wherein said detection unit reactivates the first of said image processing units in the case where the first of said image processing units does not end processing the image data in a period determined based on contents of the processing performed by the first of said image processing units.

13. The image processing apparatus according to claim 1, wherein said first memory stores image data obtained from an image input unit, said image processing units process the image data read out from said first memory, and said first bus stores the processed image data to said first memory.

14. The image processing apparatus according to claim 1, wherein the first of said image processing units compresses the image data, and said control unit controls the transfer of the image data compressed and stored in said first memory to said second memory.

15. The image processing apparatus according to claim 1, wherein said detection unit accesses the first of said image processing units, obtains the size of the processed image data, and informs said control unit of the size of the processed image data, and said control unit controls the transfer of image data of the informed size from said first memory to said second memory.

16. The image processing apparatus according to claim 1, further comprising a network controller adapted to control the transfer of the image data from said second memory to an external apparatus via a network.

17. The image processing apparatus according to claim 16, wherein said the control unit adds a header to the image data stored in said second memory, and said network controller transfers the image data to which the header is added to the external apparatus.

18. An image processing method performed by an image processing apparatus, comprising:

processing image data by image processing units;

storing image data that has been processed by the image processing units into a first memory via a first bus;

detecting processing states of the image processing units; and controlling a transfer of the image data processed by a first of the image processing units and stored in the first memory into a second memory, based on the processing state of a second of the image processing units, wherein the image data is transferred from the first memory to the second memory via a second bus.

19. The image processing method according to claim 18, further comprising reactivating the first of the image processing units in the case where the first of the image processing units does not end processing the image data in a period determined based on contents of the processing performed by the first of the image processing units.

20. The image processing method according to claim 18, wherein the image data is compressed by the first of the image processing units, and the image data compressed and stored in the first memory is transferred to the second memory based on the processing state of the second of the image processing units.

21. The image processing method according to claim 18, further comprising accessing the first of the image processing units, obtaining the size of the processed image data, and informing a control unit of the size of the processed image data, wherein image data of the informed size from the first memory is transferred into the second memory based on the processing state of the second of the image processing units.

22. The image processing method according to claim 18, further comprising transferring the image data from the second memory to an external apparatus via a network.

* * * * *